UNITED STATES PATENT OFFICE.

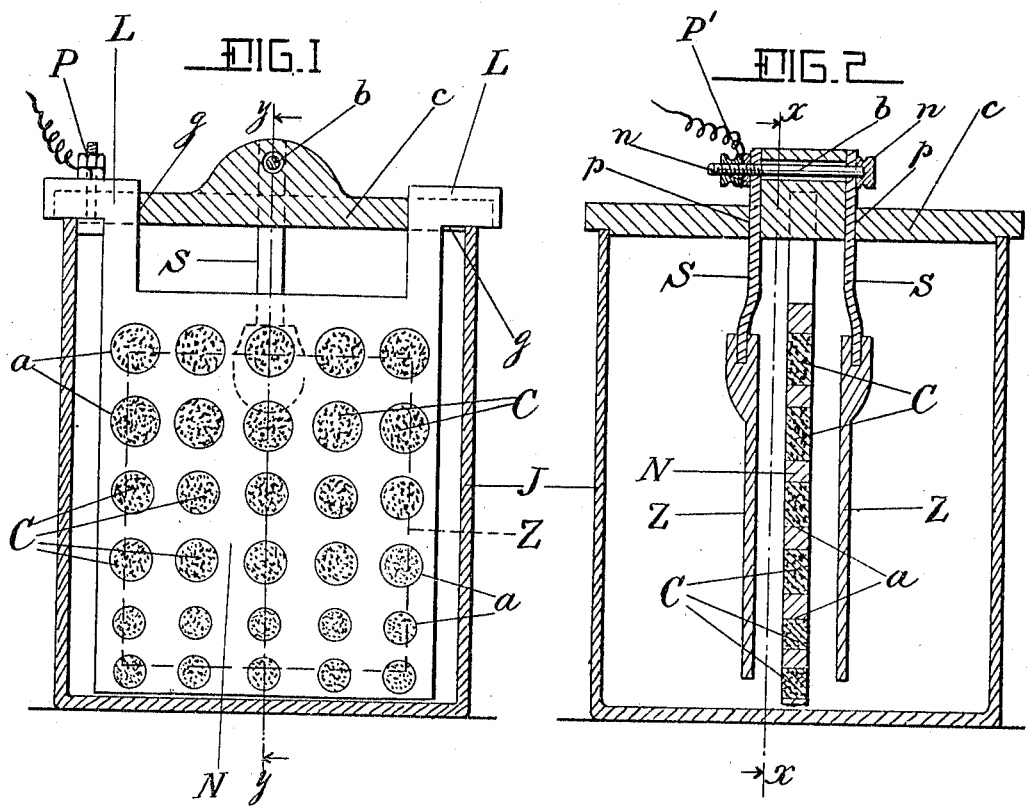

WILLIAM C. BANKS, OF NEW YORK, N. Y.

PRIMARY BATTERY.

949,256.

Specification of Letters Patent.　Patented Feb. 15, 1910.

Application filed July 29, 1907. Serial No. 385,981.

*To all whom it may concern:*

Be it known that I, WILLIAM C. BANKS, a citizen of the United States of America, residing at New York city, in the county and State of New York, have invented certain new and useful Improvements in Primary Batteries, of which the following is a specification.

My invention relates to primary batteries and consists in a novel form of one element, by the employment of which I get a better distribution of the depolarizer used, and its arrangement in such relative position and quantity that it will be fully utilized, which is a result long sought for and never satisfactorily attained in as simple an arrangement as that which I have devised.

The device is shown as applied to an ordinary 6 x 8 porcelain cell, though I do not limit myself to that form.

In the drawings, Figure 1 is a vertical sectional view on line $x$—$x$ of Fig. 2 showing one form of the element in question, suspended in a battery jar. Fig. 2 is a vertical cross sectional view on line $y$—$y$ of Fig. 1. Fig. 3 is a plan view of the underface of the cover.

J, is the ordinary jar, and N, the negative element. This element consists of the metal plate N, which is pierced with a series of apertures $a$. They may be round, square or of any other shape, and preferably are placed about one half an inch apart and have a cross area of one fourth to one half a square inch. Into these apertures I compress tightly what is known as the depolarpress or copper element, C, usually and preferably in the form of black oxid of copper.

Lugs L, or ears extend upwardly from the plate N and are usually so formed as to project over the edge of the jar and thus sustain the plate within it and above the bottom. A binding post P, is provided at one lug.

To conveniently hold the parts in proper relative position, I groove or slot the under face of the cover $c$, as at $g$, $g$, Fig. 3. Then when it is in position, the grooves or slots $g$, will fit over the lugs L, and permit the cover to rest closely on the top of the jar and will at the same time hold the plate N, in a definite position within the jar. Indentations in the jar would partially answer the purpose, but not entirely, since they would not necessarily hold the zinc and iron plate in proper relative position unless they took in a cover lug as well as the lugs of the plate. Perforations $p$, (preferably other than round) are also formed in said cover and through them I pass the shanks $s$, of the zinc elements Z, which may be connected together by a bar $b$, provided with nuts $n$, and a second binding post P'.

It will be manifest that this construction may be very conveniently assembled or taken apart; that the plates N, will not be so liable to fracture in shipment as are the ordinary oxid of copper plates, I have heretofore employed; that the contacts between the oxid and the iron will be so proportionately extensive and the depth of oxid, from contact to center, so proportionately slight, that I will be able to utilize the entire action of which that quantity of oxid is capable, obviating the difficulty I have heretofore sometimes encountered, that is that my battery (with a solid oxid plate in a holder) had ceased to be effective though a considerable portion of the oxid, (toward the center of the plate) not having been converted into metallic copper, was therefore, to a degree wasted.

In constructing my plate, I prefer to use malleable cast iron for the plate proper and to mix the oxid with a binder, such as caustic soda, to insure that the particles shall hold firmly together. Other binders might be used, and if in their use or for any other reason the material intended for performing the depolarizing action is not in its best condition when it has been forced into the apertures $a$, the whole plate thus charged may be brought to a red heat and then slowly cooled in the open air. It will then be found to be in prime condition.

This battery plate must not be confounded with a single square of compressed oxid of copper. I do not seek to claim that. In its construction the copper oxid is placed in a mold, and compressed therein and thereafter removed, but it must then be in some way connected to the terminal of the battery and whatever the connection, it is never so perfect as that which my device provides. I take a metal plate of high tensile strength and, during its formation, or later, form a series of openings in it. These openings I fill with copper oxid and then subject it to a very high pressure—and then, if need be, bring the combination to a red heat, after which it is slowly cooled in the open air, but I do not remove the oxid from the plate, consequently the very close and complete contact over the whole surface of the apertures, caused by the great pressure to which the oxid has been subjected, remains intact, and the result is very noticeable in the increased efficiency of the element as thus constructed, for, below the surface of the exciting fluid it is practically without joint, though all of the oxid may be below that level. Such complete union would be impossible with plates of low tensile strength, since they could not endure the pressure necessary to cause the complete and permanent contact with all parts of the aperture walls.

What I claim as my invention and desire to secure by Letters Patent is:—

1. A battery element, composed of a malleable iron plate, having apertures disposed generally therein, and extending therethrough, and a series of compressed oxid of copper plugs forced under intense pressure into said apertures.

2. A battery element, composed of a metal plate of high tensile strength having apertures disposed generally therein and extending therethrough and a series of oxid of copper plugs forced under intense pressure into said apertures.

3. A battery element, composed of a plate of high tensile strength, whose material is substantially immune to the action of the electrolyte, which plate is provided with a series of openings generally disposed therein, and extending therethrough, and a series of oxid of copper plugs forced under intense pressure into said openings.

In testimony whereof, I have signed my name to this specification in the presence of two subscribing witnesses, this 27" day of July 1907.

WM. C. BANKS

Witnesses:
A. G. N. VERMILYA,
WILLIAM K. GILCHRIST.